United States Patent [19]

Cesar et al.

[11] Patent Number: 5,673,037
[45] Date of Patent: Sep. 30, 1997

[54] SYSTEM AND METHOD FOR RADIO FREQUENCY TAG GROUP SELECT

[75] Inventors: Christian Lenz Cesar, Shrub Oak; Shun Shing Chan, Flushing; Thomas Anthony Cofino, Rye, all of N.Y.; Kenneth Alan Goldman, Norwalk, Conn.; Sharon L. Greene, Mt. Kisco, N.Y.; Harley Kent Heinrich, Brewster, N.Y.; Kevin Patrick McAuliffe, Peekskill, N.Y.

[73] Assignee: International Business Machines Corporation, Armonk, N.Y.

[21] Appl. No.: 303,965

[22] Filed: Sep. 9, 1994

[51] Int. Cl.$^6$ .................................................... G01S 13/75
[52] U.S. Cl. ........................... 340/825.54; 340/825.35; 340/568; 340/572; 235/385
[58] Field of Search ................... 340/825.34, 825.35, 340/825.49, 825.54, 568, 572; 235/385; 364/138, 403; 342/42, 51

[56] References Cited

U.S. PATENT DOCUMENTS

| | | | |
|---|---|---|---|
| 3,970,824 | 7/1976 | Walton et al. | 340/825.34 |
| 4,636,950 | 1/1987 | Caswell et al. | 340/825.54 |
| 4,656,463 | 4/1987 | Anders et al. | 340/572 |
| 4,673,932 | 6/1987 | Ekchian et al. | 340/825.54 |
| 5,151,684 | 9/1992 | Johnsen | 340/825.35 |
| 5,231,273 | 7/1993 | Caswell et al. | 340/825.54 |
| 5,245,534 | 9/1993 | Waterhouse | 340/825.35 |
| 5,407,050 | 4/1995 | Takemoto et al. | 340/825.35 |
| 5,410,315 | 4/1995 | Huber | 342/44 |
| 5,434,572 | 7/1995 | Smith | 342/51 |
| 5,489,908 | 2/1996 | Orthmann et al. | 342/42 |

FOREIGN PATENT DOCUMENTS

| | | |
|---|---|---|
| 0285419 | 10/1988 | European Pat. Off. |
| 0585132A1 | 8/1993 | European Pat. Off. |
| 8802718 | 6/1990 | Netherlands |

OTHER PUBLICATIONS

A.R. Grasso, "Electronic Remote Identification—A Case Study" Integrated Silicon Design Pty Ltd., 1990 IEEE pp. 14–2.1–2.3 Sep. 1990.

A. Nelson, "Research Looks into the Future", IBM's Think Magazine Jul./Aug. 1994 p. 4.

"Stationary Reading/Writing Unit Reference Manual" Texas Instruments Manual No.: RI–ACC–UM02–01 Undated.

"Duoprox Multiple Technology Proximity Card", Hughes Identification Devices, DP1330–L Series (2 pages) Undated.

*Primary Examiner*—Michael Horabik
*Assistant Examiner*—William H. Wilson, Jr.
*Attorney, Agent, or Firm*—Louis J. Percello

[57] ABSTRACT

A system and method is disclosed for selecting certain subgroups of radio frequency (RF) tags for querying, communicating, and/or identifying by a base station. The base station sends commands to a group tags within a RF field of the base station. The tags use control logic to determine whether or not they meet certain criteria sent out by the commands. This may cause the tags to change state which either prevents or allows a given tag to participate in an identification process. In this way, a given subgroup(s) of tags meeting certain criteria can be selected for querying, communicating, and/or identifying.

23 Claims, 6 Drawing Sheets

SYSTEM AND METHOD FOR RADIO FREQUENCY TAG GROUP SELECT

FIELD OF THE INVENTION

This invention relates to the field of radio frequency tagging. More specifically, the invention relates to communication with and/or identification of subsets of a group of radio frequency tags.

BACKGROUND OF THE INVENTION

A radio frequency (RF) identification system consists of an RF base station and a plurality of RF tags.

In a typical configuration, the base station has a computer section which issues commands to an RF transmitter and receives commands from the RF receiver. The commands serve to identify tags present in the RF field of the base station. In some implementations, commands exist to gather information from the tags. In more advanced systems, commands exist which output information to the tags. This output information may be held temporarily on the tag, it may remain until over written, or it may remain permanently on the tag.

The RF transmitter of the base station encodes the command from the computer section, modulates it from a base band to the radio frequency, amplifies it, and passes it to the RF antenna. The RF receiver gathers the return signal from the antenna, demodulates it from the RF frequency to the base band, decodes it, and passes it back to the computer section for processing. The base station antenna sends RF signals to and receives RF signals from one or more tags within the RF signal range.

Two useful functions of the system are to:

1) Determining if any tags meeting certain criteria are in the field (the range of the RF signal transmitted and/or received by the the base station) of the base station, and
2) Identifying tags meeting certain criteria for subsequent processing.

In the prior art there are systems that must identify all tags in the field of the reader before either of the above functions can be performed. In one system, tags are temporarily turned off when successfully identified by the reader. After a period of approximately 10 minutes, they are reactivated and must again be deactivated when presented to a reader.

Other alternatives also exist in the prior art. Some systems must identify all tags in the field. However, tags cannot be disabled to accomplish this. In another system only a single tag in the field can be identified. Tags in this system also can not be disabled.

STATEMENT OF PROBLEMS WITH THE PRIOR ART

The prior art requires that all tags in the RF field be identified and that data be read from them in order to determine if any of the tags met the criteria specified by the tagging application. This process is slow to the point where certain tagging applications are precluded.

For example, a security application might have a number of tags passing through a base station RF field in a short time. It is important that tags meeting certain alarm criteria be detected during this short time (also called real time). The requirement may be to identify and read all tags to determine alarm status during the real time that the tags are passing through the base station field. If there are a large number of tags passing through the RF field and/or the tags are passing through very rapidly, the prior art may fail to identify and read all the tags in the RF field before they pass out of the field.

As another example, a transit application might have a large number of tagged items in a tagged container. To log the movement of a container, all the tags must be identified in the container as well as the container itself. Using prior art techniques, the container might be required to pause in the field to allow enough time to identify and read all of the tags in the field. This pause may cause an undesirable delay in the movement of the container.

OBJECTS OF THE INVENTION

An object of this invention is an improved system and method to rapidly determine which tags of a group of tags meet a certain criteria.

Another object of this invention is an improved system and method to rapidly identify and/or select tags meeting certain criteria for subsequent processing.

SUMMARY OF THE INVENTION

The present invention enables rapid querying, selecting, and identifying of a large number of radio frequency (RF) tags. This is done by implementing an efficient state machine on each tag. The tags power up in a default state (READY) where they do not transmit or participate in an identification algorithm. A subset of the tags in the field can be moved into a second state (SELECTED) by a signal from the base station. In the SELECTED state the tags transmit their unique identifier to the base station in an attempt to identify themselves.

The process of moving the tags to the second state, SELECTED, is based on the data in the tag data memory. With a comparison unit and two tag commands, any arbitrarily complex selection criteria can be realized to move a given tag into the SELECT state (or back to the READY state).

Determining if any tags meeting certain criteria are in the field is performed very efficiently since the invention does not require individual tag identification. This is accomplished by each tag processing one or more "group select" and/or "group unselect" commands in sequence using control logic located on the tag. This tag control logic determines whether the respective tag meets the selection criteria.

Tags meeting the selection criteria participate in the identification process. This identification process may be limited to determining whether one or more tags are participating, but not uniquely identifying individual tags.

The invention also simplifies the identification of tags in a large group of tags. This is done by using one or more "group select" and/or "group unselect" commands to select only the relevant tags for identification. This allows the system to process only tags which are of interest, i.e., meet the selection criteria. This feature improves the speed at which the system can process tags and allows the system to select subgroups of tags for processing from very large numbers of tags.

Other protocols may be used with the present invention. In one preferred embodiment, more than one tag simultaneously communicating with the base station can be identified by using the protocol described in U.S. Patent application to S. Chan et al. entitled "MULTIPLE ITEM RADIO FREQUENCY TAG IDENTIFICATION PROTOCOL" now U.S. Pat. No. 5,550,547, which is herein incorporated by reference in its entirety.

DETAILED DESCRIPTION OF THE INVENTION

Figure 1:
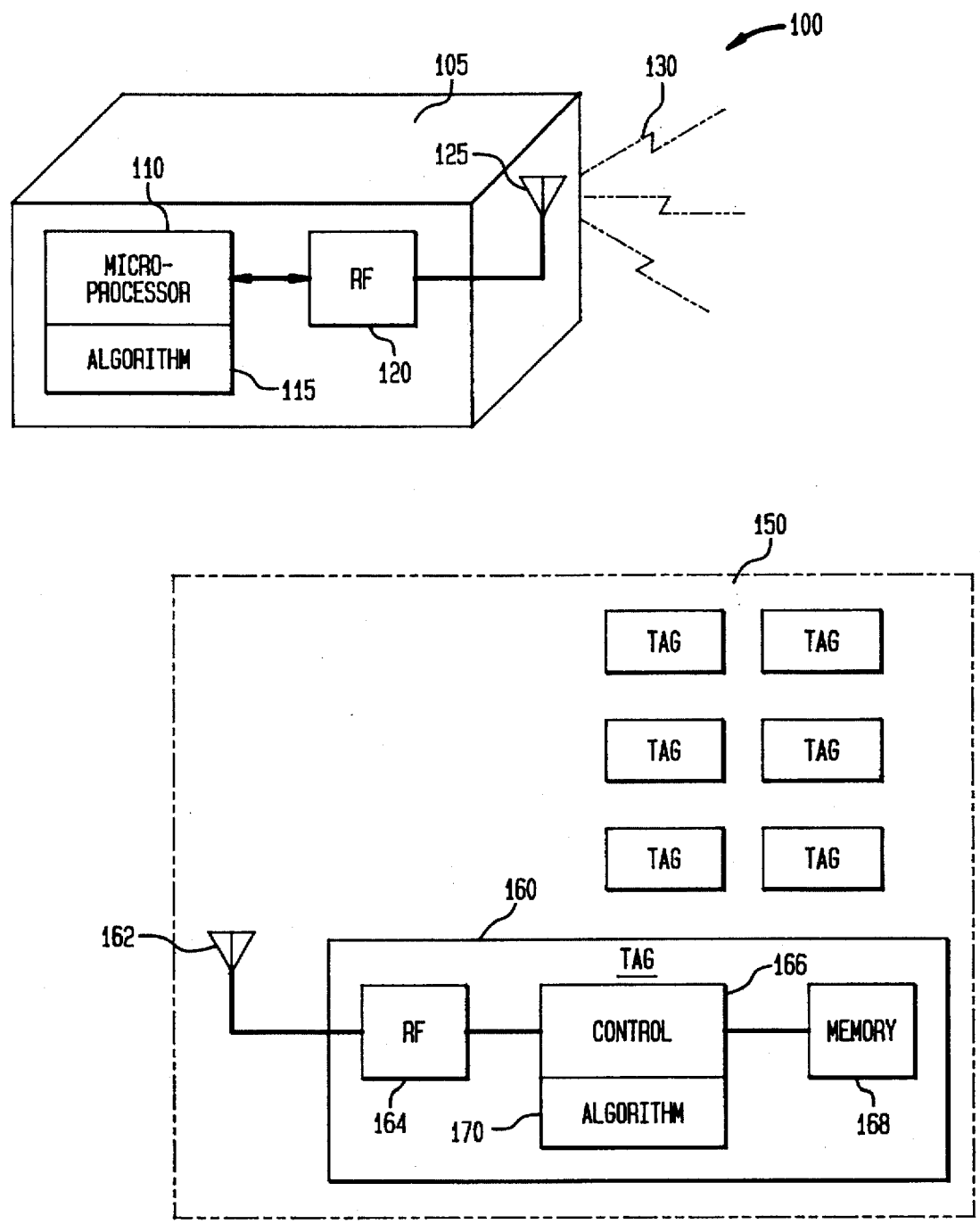
FIG. 1 is a block diagram of the present system showing a base station and a plurality of novel tags.

The system 100 is comprised of two types of hardware, a base station 105 and a plurality of tags 150.

The base station 105 includes a microprocessor 110 running a novel base station algorithm 115. The microprocessor has a duplex connection to a radio frequency (RF) front end 120, which in turn connects to an RF antenna 125. The resulting RF signal 130 is broadcast to the tags. Base stations 105 of this type (without the novel algorithm 115) are well known.

Each tag (typically 160) in the group 150 of tags contains a tag antenna 162 which couples the RF signal 130 to the RF front end 164. This in turn connects to the tag control circuit 166. The control circuit implements an algorithm 170, and interfaces to the tag memory 168.

Figure 2:
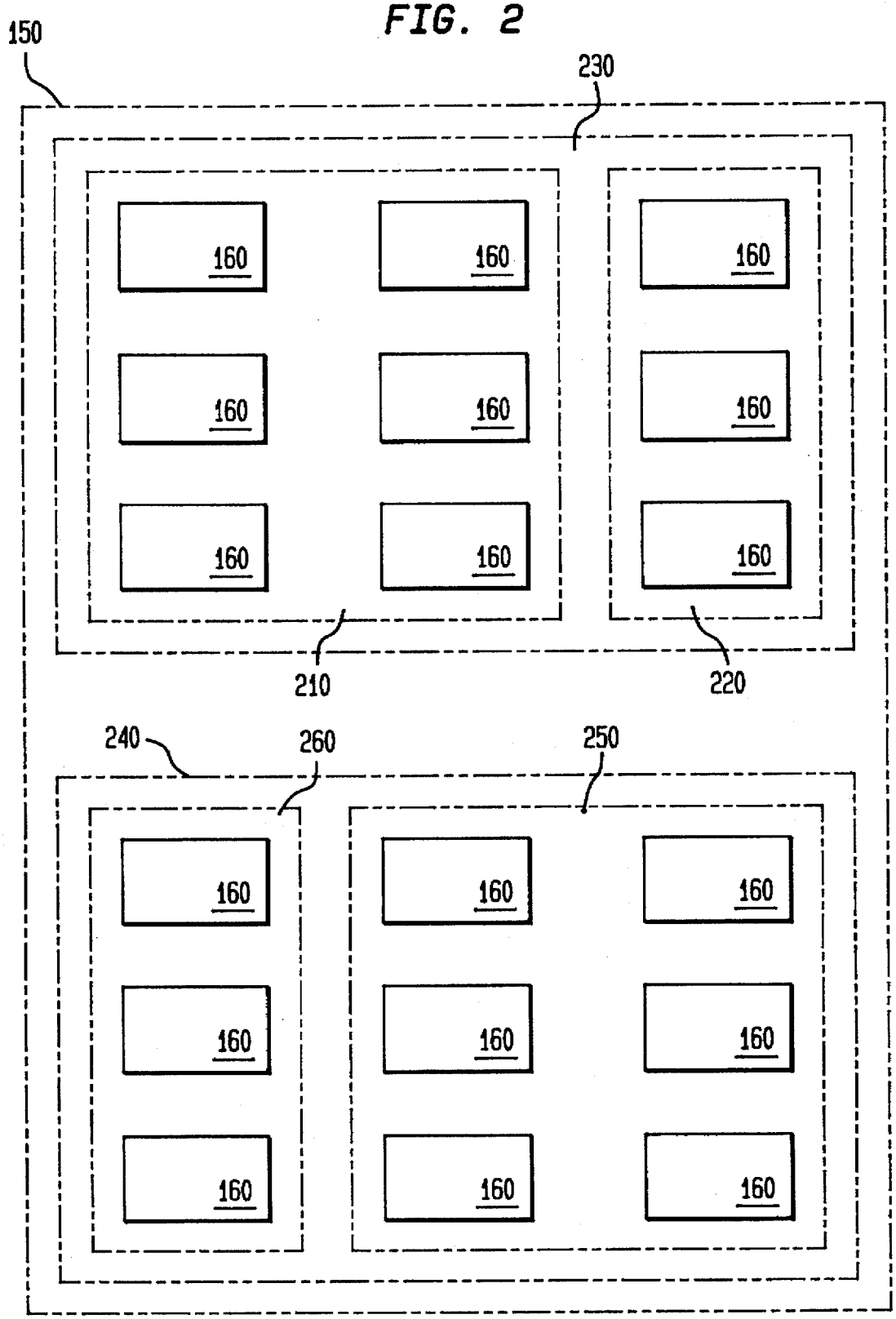
FIG. 2 is a drawing showing the concept of tag groups and subgroups.

FIG. 2 shows the concept of tag groups 150 and subgroups (210, 220, 230, 240, 250, and 260).

The plurality of tags 150 in the RF field 130 of the base station 105 is represented by the 18 tags shown. A base station 105 is able to communicate with a tag (typically 160) in the RF field 130 of the base station 105 using the RF field 130 or signal 130. Tags in the RF field 130 are said to be in the tag group 150.

A group select command can be used to select the subgroup (for example, 210) from the tag group 150 and move it to a SELECTED state using the algorithm 115 on the base station, algorithm 170 on the tag, and the tag control logic 166 processing the commands 410 and 460. See FIG. 4.

Note that several different subgroups can be moved from a READY state to a SELECTED state by sending a signal 130 from the base station 105. The subgroups moved, i.e., the subgroups that have tags that change state, are determined by criteria sent out by the base station.

In essence, tags meeting any one of the selection criteria of the group select commands are placed in the SELECTED state. In the example above, tags meeting the first OR the second criteria (i.e., tags in subgroups 210 and 220 of group 150) are selected, forming the subgroup 230.

To illustrate, suppose that the plurality of tags 150 identify and/or are attached to clothing items. Further, suppose that it is desired to determine whether there are any socks or shirts in the RF field 130. Finally, suppose that the tag memory 168 has an address A10, with data D10 for socks and D11 for shirts.

Figure 6:
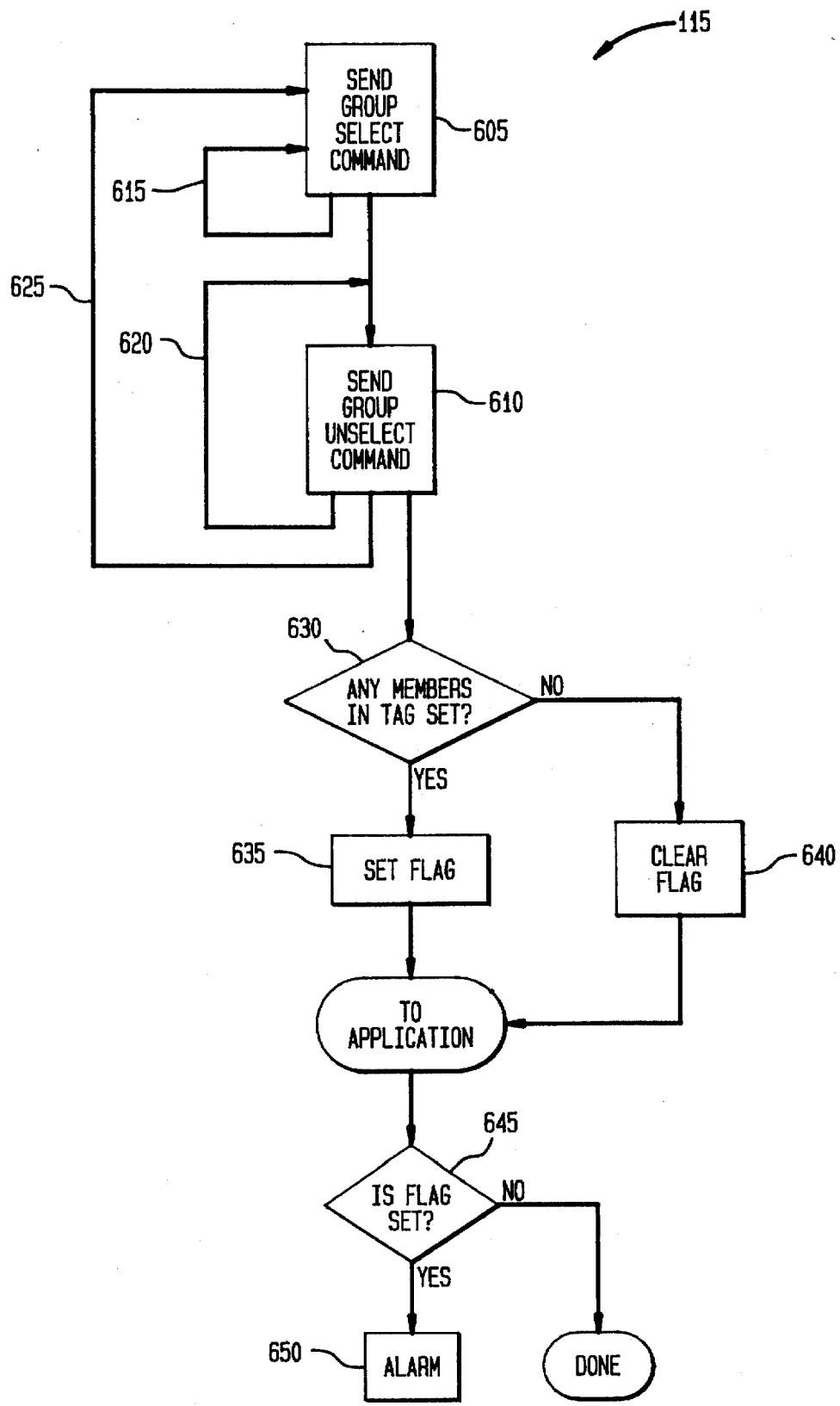
FIG. 6 is a flow chart showing the steps performed by one preferred embodiment of a novel base station algorithm.

Socks or shirts are selected, like subgroup 230, of group 150 above by running the base station algorithm 115. Refer to FIGS. 4 and 6. The first step 605 would be to send a group select command 410 (received by the tags) with the following fields:

command 510—group select
function 515—equals
address 520—including A10
mask 525—mask only A10
data 530—D10 which would cause the subgroup 210 of socks to move from the READY state to the SELECTED state.

The next step would be to send a group select command 410 (received by the tags) with the following fields:

command 510—group select
function 515—equals
address 520—including A10
mask 525—mask only A10
data 530—D11 which would cause the subgroup 220, of tags associated with shirts to move from the READY state to the SELECTED state. Therefore, the subgroup 230, comprising subgroups 210 (socks) and 220 (shirts) is the logical OR (or union) of the two subgroups 210 of socks and 220 of shirts, and is now in the SELECTED state.

A group unselect command can move a subgroup back to the READY state. The group unselect command performs a logical AND (or intersection) function.

For example, suppose that it is desired to determine whether there are any pale green pants in the RF field 130. Further, suppose that the tag memory 168 has an address A10, with data D12 for pants and an address A20, with data D21 for pale green colors.

The first step would be to send a group select command 410 (received by the tags) with the following fields:

command 510—group select
function 515—equals
address 520—including A10
mask 525—mask only A10
data 530—D12 which would cause the subgroup 240 of pants to move from the READY state to the SELECTED state.

The next step would be to send a group unselect command 460 (received by the tags) with the following fields:

command 560—group select
function 565—not equals
address 570—including A20
mask 575—mask only A20
data 580—D21 which would cause the subgroup 250 of pants whose color is not pale green to move from the SELECTED state to the READY state. The subgroup 260, which is the logical AND of the two subgroups 240 of pants and not 250 of not pale green, is now in the SELECTED state.

Figure 3:
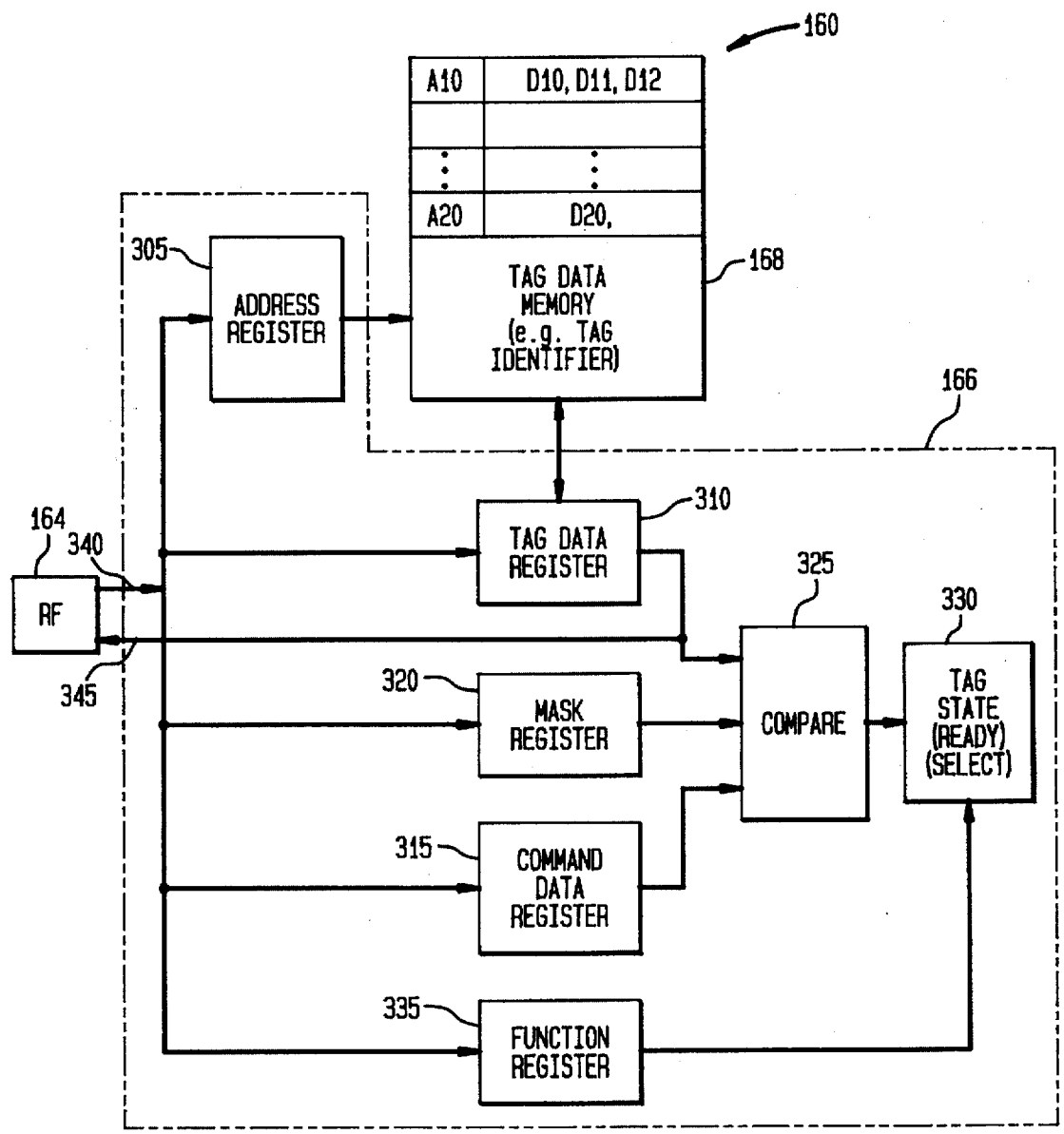
FIG. 3 is a block diagram of a preferred embodiment of the novel tag of the present invention.

FIG. 3 is a block diagram of one typical preferred embodiment of a tag 160 and further illustrates how the tag moves between states.

Data enters and leaves the control block 166 through the RF block 164.

Within the control block 166, the appropriate fields (see description of FIG. 5 below) of the command sent from the base station 105 are routed to an address register 305, a mask register 320, a function register 335, and a command data register 315. More specifically, the value in the command field (510, 560) and function field (515, 565) of the base station 105 signal 130 is placed in the function register 335, the value in the data field (530, 580) of the signal 130 is placed in the command data register 315. The value in the mask field (525, 575 in FIG. 5) of the command signal 130 is placed in the mask register 320, and the value in the address field (520, 570) of the signal 130 is placed in the tag address register 305.

In one preferred implementation, the data emanating from the RF block 164 is serial digital data, and the registers (305, 320, 315, 335) are shift registers which are loaded in turn. The registers could also be parallel loadable registers, with a field of data being assembled before being loaded into a register. The determination of where the data fields are loaded is determined by the command field (510, 560).

After the fields of the signal 130 are stored in the tag registers, a group select or group unselect operation begins by reading data from the tag data memory 168 into the tag data register 310. The data read is determined by the value previously loaded into the address register 305.

In one preferred implementation, the tag memory 168 holds byte wide (8 bit) data, and the tag data register 310 is a parallel in/serial out shift register. The memory could also be bit wide, with the tag data register being a simple one bit storage device.

In a preferred embodiment, the mask indicates whether or not the data should be acted upon. If it is to be acted upon, the tag data 310 and command data 315 are compared in the compare block 325. In another preferred embodiment, the mask could be more complex. For example, it could modify the type of function to be performed rather than simply enabling a function.

In one preferred embodiment, the command data field (530, 580) is 8 bytes, the tag data memory 168 is one byte wide, and the mask contains a logic 1 for each byte which should participate in the comparison and a 0 for each byte which should be ignored. As each byte in turn is read from the tag data memory 168 to the tag data register 310 and routed to the compare unit 325, one bit of the mask register 320 is used to determine whether the data should be used or ignored.

Note that in a preferred embodiment, a mask of all zeros says that all data is ignored. The result is a useful select all tags or unselect all tags function.

The compare unit determines the results (greater than, greater than or equal, equal, less than, less than or equal) as data is received. The compare unit 325 computes the results for each masked data item using standard digital arithmetic and passes the results to the tag state machine 330. Once the compare operation is complete, the tag state 330 is updated.

If required, the compare operation can be repeated multiple times as data is received in the command data register and data is read from the tag data memory to the tag data register.

For example, suppose that the address A1 reads 8 bytes and the first three bytes (here these first three bytes might be the address A10 described above) contain data D10 describing the item as socks. To group select all socks, the command data field 410 would have the following fields command 510—group select
function 515—equals
address 520—A1
mask 525—11100000
data 530—D10

Once the compare operation is complete, the tag state 330 is updated. In this example, an 8 byte compare with mask is performed. Alternatively, a different number of bits could be used, or the mask could be bit wide.

The tag states in the tag state machine 330 are READY (the tag is in the set of unselected tags) and SELECTED (the tag is in the set of selected tags). A preferred state machine is a one bit register. In one preferred embodiment, that tag might have other states (for example, shut down, identified, error states, etc.) with a correspondingly more complex state machine 330.

An additional path connects the tag data register back to the RF section. This read data path can be used to identify and classify individual tags in the base station. In a typical implementation, the connection between the RF block 164 and the control block 166 contains a transmit path 340 and a receive path 345. Alternatively, there could be one bidirectional path.

Figure 4B:
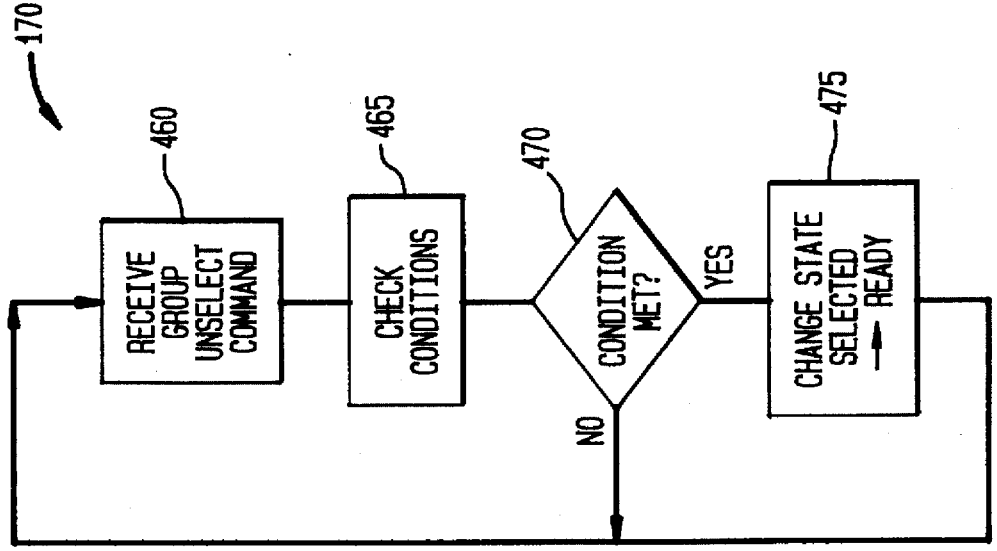
FIG. 4A is a flow chart showing the steps of an OR function performed in the tag and FIG. 4B is a flow chart showing the steps of an AND function performed in the tag.
Figure 4A:
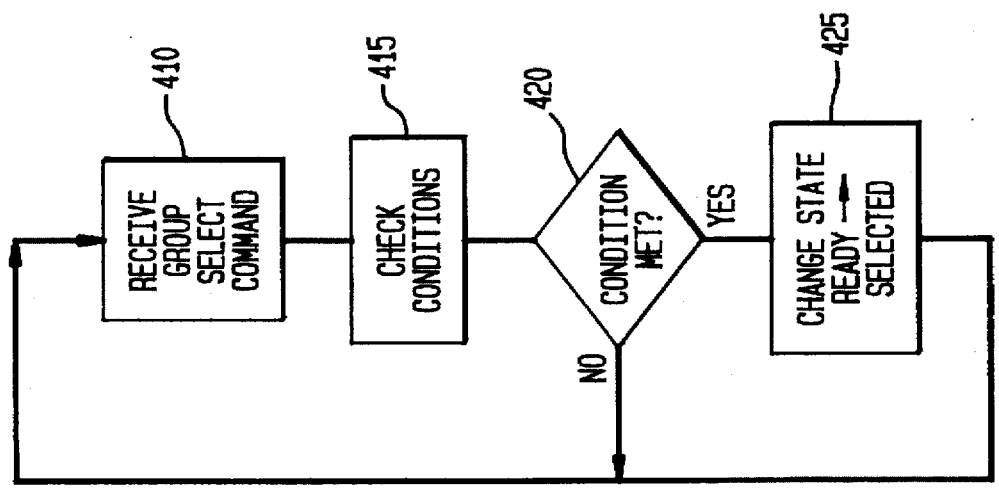

FIG. 4a shows the tag 160 selection algorithm 170 in more detail.

In step 410 the group select command is received by the tag control logic.

In step 415, the conditions of the command are checked as described in FIG. 3 using the tag data memory 168, the tag data register 310, the mask register 320, the command data register 315, and the compare block 325.

In step 420, the control logic decides whether the conditions were met, using the compare block 325 and the function register 335.

If the conditions (i.e. the compare conditions) were not met, the tag state 330 does not change and the tag waits for the next command.

If the conditions are met, step 425 changes the tag state 330 from READY to SELECTED. That is, the tag moves from the set of unselected tags to the set of selected tags.

For example, to select all tags which indicate socks, the group select command 410 would indicate a group select on equals, with the address pointing to the potential socks data, the mask selecting only the potential socks field within the address, and the data indicating socks.

FIG. 4b shows the tag 160 unselection algorithm 170 in more detail.

In step 460, the group unselect command is received by the tag control logic.

In step 465, the conditions of the command are checked as described in FIG. 3 using the tag data memory 168, the tag data register 310, the mask register 320, the command data register 315, and the compare block 325.

In step 470, the control logic decides whether the conditions (i.e., the compare conditions) were met, using the compare block 325 and the function register 335.

If the conditions were not met, the tag state 330 does not change and the tag waits for the next command.

If the conditions are met, step 475 changes the tag state 330 from SELECTED to READY. That is, the tag moves from the set of selected tags to the set of unselected tags.

For example, to unselect all tags which indicate colors other than pale green, the group unselect command 460 would indicate a group unselect on not equals, with the address pointing to the color data, the mask selecting only the color field within the address, and the data indicating pale green.

Figure 5A:
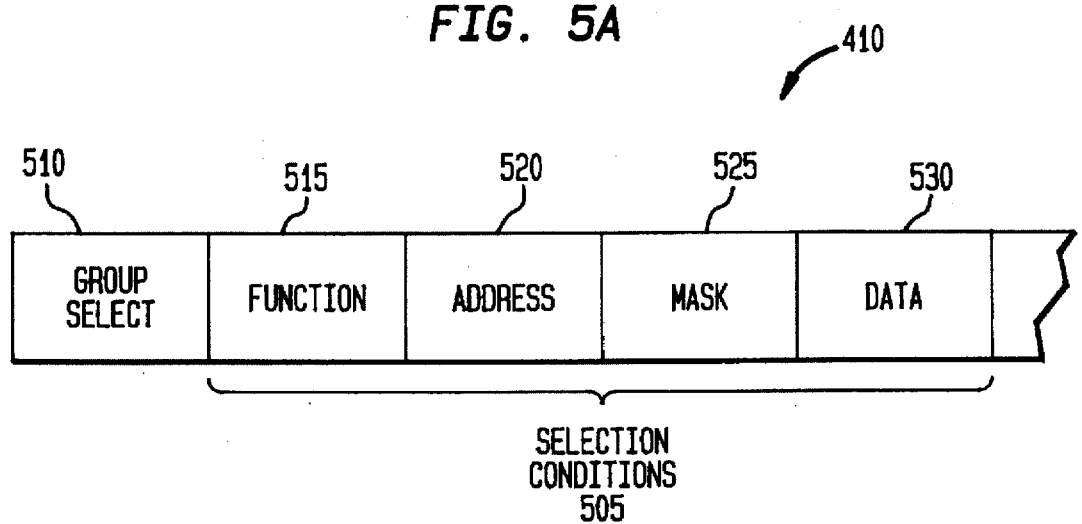
FIG. 5A is a block diagram showing the format of a preferred embodiment of a "group select" command and FIG. 5B which is a block diagram showing the format of a preferred embodiment of a "group unselect" command sent out by the base station.
Figure 5B:
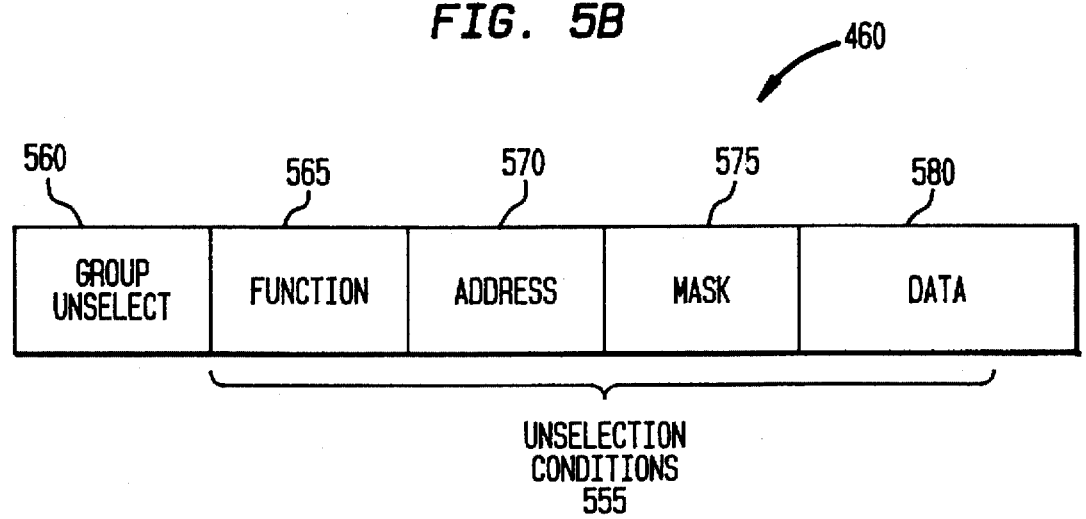

FIG. 5 shows preferred formats for a group select or group unselect command received from the tag RF block 164 through the path 340 (FIG. 3) initially sent from the base station 105.

The first field, 510 or 560, indicates the type of command, select or unselect, field 510 for select commands and field 560 for unselect commands. In a preferred embodiment, the tag implements other commands, (e.g. read, write, etc.) and the field contains multiple bits which describe the command. In a typical implementation, the bits could be either coded or contain one bit per command.

The next field, 515 (select) or 565 (unselect), indicates the type of command function. In a typical implementation, the functions includes equal, not equal, greater than, less than, greater than or equal, or less than or equal. A more complex tag could implement additional functions or combinations of functions in the function register 335, the mask register 320, and the compare block 325.

The next field, 520 (select) or 570 (unselect), contains the tag memory address. Its exact format depends on the configuration of the tag data memory. In a preferred embodiment, the address would access 8 bytes of tag data memory, with individual bytes selected via the mask field. In an alternative implementation, a one byte address or a bit address could be used.

The next field, 525 (select) or 575 (unselect), holds the mask. Its format also depends upon the tag data memory format and the mask granularity desired. For example, the mask could be on a bit by bit basis, or it could mask 8 bit bytes. In a typical implementation, the mask enables or inhibits the compare block 325, but more complex masking is also possible.

The final field, 530 (select) or 580 (unselect), holds the command data. This is the data with which the tag data is compared. Again, the format is dependent on the tag data memory configuration and the application. A typical size could be one bit, an 8 bit byte, or a number of bytes.

In a preferred embodiment, the format of the command selection conditions 505 and 555 would be identical. In this way, the tag control logic acts on the commands in the same manner, with only the final state change dependent upon the actual command.

For example, the command to select pale green items would be:

command 510—group select function 515—equals address 520—address including the color field in tag data memory mask 525—mask of the actual color bytes in tag data memory data 530—code indicating pale green Similarly, the command to unselect pale green items would be:

command 560—group unselect function 565—equals address 570—address including the color field in tag data memory mask 575—mask of the actual color bytes in tag data memory data 580—code indicating pale green FIG. 6 describes the base station algorithm.

The first step, 605, is a group select command. This moves a subset of tags from the READY state to the SELECTED state. This group select step 605 can be repeated any number of times as required, 615, to move more tags from READY to SELECTED. This performs an OR function.

The next step, if required, is 610. This group unselect command acts on the tags in the SELECTED state. A subset of them moves back to the READY state. This performs an AND function. This group unselect step 610 can be repeated any number of times as required, 620, to move more tags from SELECTED to READY.

For example, to select socks and shirts, one group select command 605 selects socks. Through 615, another group select command 605 selects shirts. The result is that items which are shirts OR socks are selected.

In another example, to select pale green pants, a group select command 605 selects pants. Then a group unselect command 610 unselect not pale green. The result is that items which are pants and pale green are selected.

After the tags now in the SELECTED state are accessed, the entire selection process can be repeated as required, indicated by the path 625.

In a typical application, accessing the tag could consist of identifying individual items and reading a universal product code (UPC).

This flexibility allows tags to be selected using an arbitrarily complex logical equation.

For example, it would be possible to identify all pale green pants sizes 30 through 34 manufactured in Connecticut or mens socks manufactured between January and March.

In one application, querying, a flag is set if the selected subgroup has one or more members. In that application, tags remaining in the SELECTED state after processing a group select or group unselect command would transmit back to the base station.

The base station, in 630, would detect the presence or absence of a return signal from one or more tags. If a signal is detected, a flag is set in 635. If a signal is not detected, the flag is cleared in 640. The flag state can be determined without identifying individual tags. In other words, the base station has queried the tag group to determine if any tags met certain conditions (or criteria) without ever identifying a tag.

For example, an application could scan a display of pale green pants for misshelved items, The application would first group select on not pants. A set flag indicates the presence of not pants tags, and the application knows that items are misshelved. If the flag is not set, the application next group selects pants and then group unselect pale green colors. A set flag now indicates the presence of pants which are not pale green. Again the application knows that items are misshelved.

In another application, the flag is an alarm. The selection conditions are arranged by the application so that the only tags remaining in the SELECTED state are those tags for which security is being breached. In that case, in step 645, the application would check the flag. If the flag is set, the application implements its alarm procedure 650.

For example, an application could group select all retail items, followed by a group unselect on items marked paid. A set Flag indicates unpaid items passing through the field, which can be used by the application to trigger an alarm.

Given this disclosure, one skilled in the art could construct other embodiments that are equivalent to those disclosed here. These embodiments are within the contemplation of the inventors.

We claim:

1. A method of selecting subgroups of a group of radio frequency tags comprising the steps of:

a. sending a radio signal from a base station to a plurality of radio frequency tags, the radio signal carrying one or more commands, the commands each being one of a SELECT command and an UNSELECT command, the tags each having a radio frequency communications component for receiving the command and a tag memory with tag fields;

b. using one or more of the SELECT commands to initiate a comparison between a select condition on the respective SELECT commands to a select tag data value in the tag memory of each of the tags, and moving one or more of the tags to a SELECTED state if the tag data value meets the selection condition, the tags moved to the SELECTED state being in a selected subgroup; and c. using one or more of the UNSELECT commands to initiate a comparison between an unselect condition on the respective UNSELECT commands to an unselect tag data value in the tag memory of each of the tags, and moving one or more of the tags to an UNSELECTED state if the unselect tag data value meets the unselection condition, the tags moved to the UNSELECTED state being in an unselected subgroup.

2. A method of selecting subgroups of tags, as in claim 1, where the tags in the selected subgroup send a tag identifier to the base station.

3. A method of selecting subgroups of tags, as in claim 1, where the tags in the selected subgroup change data in one or more tag fields of their respective memory.

4. A method of selecting subgroups of tags, as in claim 1, where steps 1a and 1b are repeated one or more times to create a ORed subgroup the repeating ending when a ORed condition is met that includes the union of the tags of each of the selected subgroups.

5. A method of selecting subgroups of tags, as in claim 1, where the tags in the selected subgroup send a response to the base station to indicate that the selected subgroup has one or more members.

6. A method of selecting subgroups of tags, as in claim 5, where the base station has a flag and the flag is set if the selected subgroup has members.

7. A method of selecting subgroups of a group of radio frequency tags comprising the steps of:
   a. sending a radio signal from a base station to a plurality of radio frequency tags, the radio signal carrying one or more commands, the commands each being one of a SELECT command and an UNSELECT command, each of the commands defining one or more conditions, the tags each having a radio frequency communications component for receiving the command and a tag memory with tag fields;
   b. sending one or more SELECT commands on the radio signal;
   c. comparing a selection condition on the SELECT commands to a select tag data value in the tag memory of each of the tags, and moving one or more of the tags to a SELECTED state if the select tag data value meets the selection condition, the tags moved to the SELECTED state being in a first selected subgroup of tags from the group of tags, and the tags in the first selected subgroup having data in their respective tag memory that meets the selection condition;
   d. sending one or more UNSELECT commands on the radio signal from the base station to the plurality of radio frequency tags, the UNSELECT commands defining an unselection condition; and
   e. comparing the unselection condition on one of the UNSELECT commands to an unselect tag data value in the tag memory of each of the tags in the first selected subgroup, and moving one or more of the tags in the first selected subgroup out of the SELECTED state if the unselect tag data value meets the unselection condition, the remaining tags in the SELECTED state being a second selected subgroup of tags, the tags in the second selected subgroup having data in their respective tag memories that meet the selection conditions and do not meet the unselection conditions.

8. A method of selecting subgroups of tags, as in claim 7, where steps 7d and 7e are repeated one or more times to create an ANDed subgroup which includes the tags in the intersection of each of the second selected subgroups.

9. A method of selecting subgroups of tags, as in claim 7, where the selection conditions are one or more of the logical comparisons including greater than, less than, equal, not equal, greater than or equal, and less than or equal.

10. A method of selecting subgroups of tags, as in claim 9, where the comparison is made between a data value sent from the base station and a tag value stored in the tag memory.

11. A method of selecting subgroups of tags, as in claim 10, where the SELECT command further includes a select mask and the selected tag value is a value obtained by masking a tag memory location with the select mask.

12. A method of selecting subgroups of tags, as in claim 7, where the unselection conditions are one or more of the logical comparisons including greater than, less than, equal, not equal, greater than or equal, and less than or equal.

13. A method of selecting subgroups of tags, as in claim 12, where the comparison is made between a data value sent from the base station and a tag value stored in the tag memory.

14. A method of selecting subgroups of tags, as in claim 13, where the UNSELECT command further includes a unselect mask and the unselect tag value is a value obtained by masking a tag memory location with the unselect mask.

15. A system for selecting subgroups of radio frequency tags from a group of tags, comprising:
   a. a base station for communicating radio frequency commands to the tags, the commands comprising command type, function, tag memory address value, and command data, the command type capable of being any one of a select command and a UNSELECT command;
   b. a plurality of tags having radio frequency component for receiving the radio frequency commands from the base station and sending radio frequency information to the base station, a tag memory with a tag memory address and a tag memory data, tag control logic, a tag compare function, and a tag state, whereby the command type sent by the base station causes the tag control logic to perform the function sent by the base station in the tag compare function to compare the tag memory data located in the tag memory address specified by the tag memory address value with the command data, and if the respective comparison condition are met, the tag control logic causing the tag to move to a SELECTED state if the command type is a SELECT command and the tag control logic causing the tag to move to an UNSELECTED state if the command type is an UNSELECT command.

16. A system as in claim 15, where the command type is a SELECT command and the tag logic causes the tag to move from a READY state to a SELECTED state.

17. A system, as in claim 15, where the command type is an UNSELECT command and the tag logic causes the tag to move from a SELECTED state to a READY state.

18. A system, as in claim 15, where the tags identify any one or more of the following items: clothing, a Universal Product Code, inventory, a date of manufacture, a place of manufacture, a color, and a size.

19. A system as in claim 15, where the command type is the SELECT command and the tag logic causes the tag to move a SELECTED state and the base station is capable of querying all the tags and only the tags in the SELECTED state respond back to the base station.

20. A system, as in claim 19, where the base station is electrically connected to a security alarm that is enabled if there are any tags in the SELECTED state that send a signal back the base station.

21. A radio frequency transponder comprising:
   a radio frequency component for receiving one or more frequency signals, the radio frequency signals carrying one or more commands, the commands having a command type, a command function, a tag memory address value, and a command data, the command type capable of being any one of a SELECT command and an UNSELECT command;

a tag memory with a tag memory address and tag memory data;

a tag control logic performing the command function, the command function specifying a comparison with one or more comparison conditions; and a tag compare function performing the comparison between the tag memory data located in the tag memory address specified by the tag memory address value and the command data, if the comparison conditions are satisfied, the tag control logic causing the tag to move to a SELECTED state if the command type is a SELECT command the tag control logic causing the tag to move to an UNSELECTED state if the command type is an UNSELECT command.

22. A tag, as in claim 21, where the comparison conditions are logical operations.

23. A tag, as in claim 22, where the logical operations include one or more of the following: greater than, less than, equal, not equal, greater than or equal, and less than or equal.

* * * * *